United States Patent [19]

Snyder, Jr. et al.

[11] 4,150,866

[45] Apr. 24, 1979

[54] ENVIRONMENTALLY SEALED CONNECTOR

[75] Inventors: Clair W. Snyder, Jr., Hellam; Paul B. Derr, Middletown; Thomas H. Wycheck, Harrisburg, all of Pa.

[73] Assignee: AMP Incorporated, Harrisburg, Pa.

[21] Appl. No.: 827,910

[22] Filed: Aug. 26, 1977

[51] Int. Cl.2 .................... H01B 17/30; H01B 19/00; H01R 7/02; H02G 15/04

[52] U.S. Cl. .................................. 339/94 M; 29/629; 29/631; 174/145; 339/91 R

[58] Field of Search ................ 339/91 R, 94 R, 94 M, 339/116 R, 116 C, 176 M, 217 S, 89 M; 174/148, 195; 29/629, 631, 235, 109; 277/212 R; 264/153

[56] References Cited

U.S. PATENT DOCUMENTS

| | | | |
|---|---|---|---|
| 2,740,098 | 3/1956 | Phillips | 339/138 X |
| 3,133,777 | 5/1964 | Anhalt | 339/91 R |
| 3,252,128 | 5/1966 | Clark | 339/217 S |
| 3,781,764 | 12/1973 | Johnson | 339/94 |

*Primary Examiner*—Roy Lake
*Assistant Examiner*—E. F. Desmond
*Attorney, Agent, or Firm*—Russell J. Egan

[57] ABSTRACT

An improved environmentally sealed connector is disclosed. The connector includes mating members having bodies of semi-rigid dielectric material with a plurality of contact receiving cavities therein. A like plurality of seals are provided each inserted into a recessed rear end portion of a respective contact receiving cavity to effect seating engagement with both the member and the wires connected to the terminals mounted therein. A plurality of seals are preferably molded in a single sheet and are so spaced therein that they can be punched therefrom and inserted directly into the rear of the connector member contact receiving cavities. The seals allow easy replacement of the contacts without destroying the sealing characteristics. The connector members also include radially deformable locking means and sealing means at the mating faces.

17 Claims, 9 Drawing Figures

Fig. 1
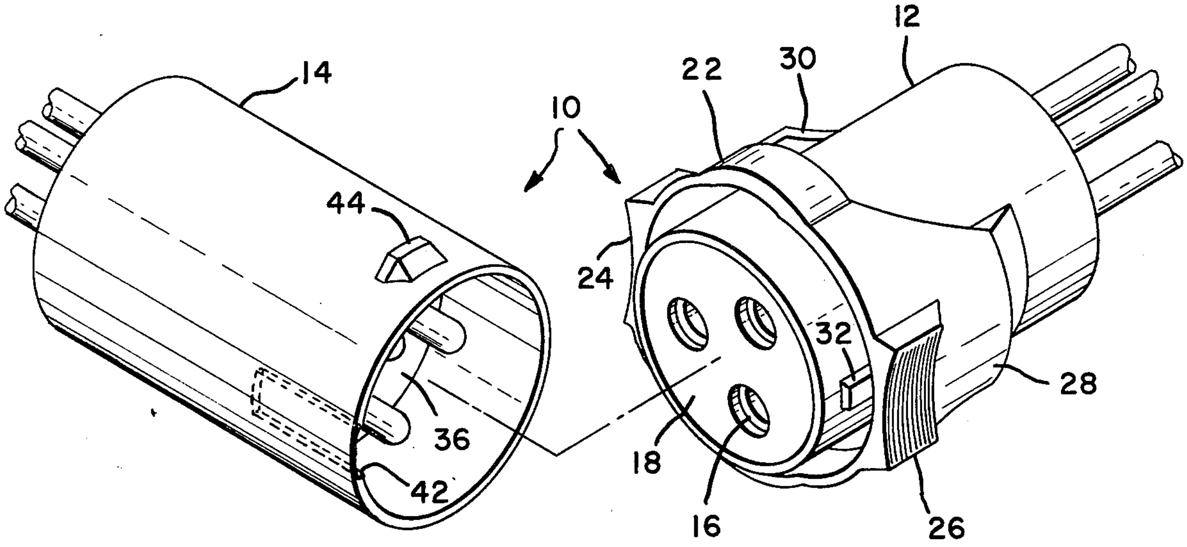
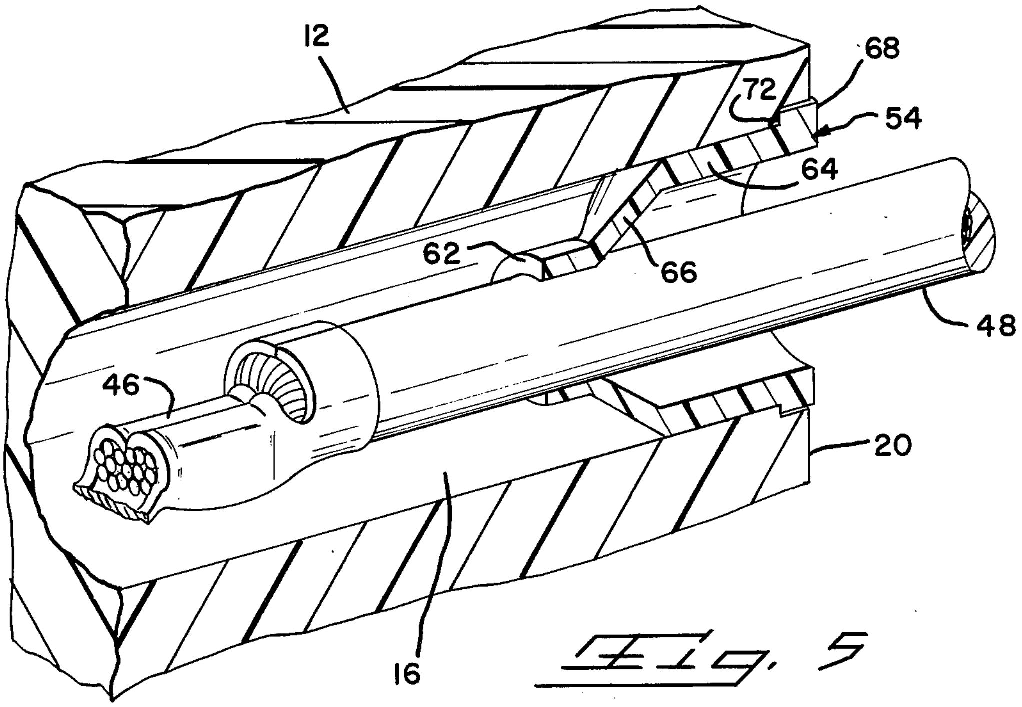
Fig. 5

ENVIRONMENTALLY SEALED CONNECTOR

BACKGROUND OF THE INVENTION

1. The Field of the Invention

The present invention relates to an environmentally sealed connector and in particular to a plurality of seals which are formed in unitary sheets or strips, cut therefrom and inserted into a connector member in gang fashion.

2. The Prior Art

There have been many attempts to produce environmentally sealed connectors to meet the wide range of requirements of the industry. For example, U.S. Pat. Nos. 3,327,282 and 3,970,352 disclose connectors having a resilient sealing grommet bonded to the rear surface of a rigid disc and a cylindrical sealing member bonded to the front surface of the disc. Elongated contact cavities extend through the grommet, disc and sealing member. The cavities in the grommet include annular wire sealing risers or orifice restricting flanges which engage the contact wire. All of the sealing components are encased in a rigid housing. While such an arrangement provides adequate environmental sealing, this type of connector is both difficult and expensive to manufacture as well as to repair or replace contacts.

It has also been proposed to construct an environmentally sealed electrical connector out of entirely flexible members. For example, U.S. Pat. Nos. 3,874,761; 3,880,487; 3,930,705; and 3,953,099 all show such connectors. They generally include profiled mating members with flexible sealing boots and/or hoods. However, experience has proved that these connectors are difficult to mate and unmate. It has also been proven that the sealing efficiency of these one piece connectors deteriorates with use and that they cannot be repaired but must be replaced.

A further approach to sealing electrical connectors is represented by U.S. Pat. No. 3,678,441 which shows an interfacial seal which collapses between members as they are mated. The location of this seal makes mating of this connector difficult.

U.S. Pat. No. 3,718,892 shows a weatherproof boot sealing assembly formed by a plurality of individual boot seals joined together and having terminal plug openings therethrough. The boot assembly is fitted over rear extensions of the connector housing with each individual boot forming a sealing engagement. Individual sealing boots are shown in U.S. Pat. No. 3,787,796. These sealing boots are not ganged together but are individually mounted on the conductors. They have radially outwardly extending flanges which engage the rear surface of the associated connector member and a cylindrical portion which is radially deformed when forced into an annular space formed between the conductor and wall of the passage in the housing.

The above discussed sealed connectors have not satisfied the need for environmentally sealed connectors in many industries. The basic need remains for a good seal which will allow the contacts to be replaced or repaired without destroying the sealing characteristics of the connector. It is also desirable to have the sealing means recessed within the connector members so that there is a wiping action between both the seal and connector and the seal and conductor. This assures that any dirt or debris will be removed from the connector with the contact.

SUMMARY OF THE INVENTION

The present invention concerns an environmentally sealed electrical connector including a pair of mating housing members of at least semi-rigid material having mating faces and rear surfaces and defining at least one aligned contact receiving cavity therein extending between the mating face and rear surfaces. The members also include radially deformable locking means for joining the mated members and sealing means at the mating faces. A plurality of sealing members are fabricated in multiple form by molding numerous seals in a sheet or strip of sealing material and are separated from the sheet or strip and driven directly to seat in recesses of rear portions of the contact receiving cavities of the respective members. The seals have a portion with an outer diameter which makes sealing engagement with the housing members and another portion with an inner diameter which makes sealing engagement with the conductors attached to terminals mounted in the housing members. An intermediate portion allows relative expansion and deformation of the other portions independently of each other. The intermediate portion further includes an interior surface having a taper to facilitate insertion of a lead therethrough.

It is therefore an object of the present invention to produce an improved environmentally sealed electrical connector in which the terminals may be readily replaced without destroying the sealing characteristics of the connector.

It is another object of the present invention to produce an improved environmentally sealed connector for both electrical and fiber optic applications in which the sealing means effect a wiping action to assure removal of dirt or debris from the connector when leads or cables are removed therefrom.

It is yet another object of the present invention to produce an improved environmentally sealed electrical connector in which mating connector members include key and keyway means to effect polarized mating of the members.

It is a further object of the present invention to provide an improved environmentally sealed electrical connector in which the rear seals are fabricated in multiple form by molding in a common sheet or strip and individual seals are blanked from the sheet or strip and inserted directly into recessed contact receiving cavities of connector members in gang fashion.

It is a further object of the present invention to provide an improved environmentally sealed electrical connector in which rear seals which produce a tactile indication of proper seating, especially upon replacement of a contact into a housing member.

It is a still further object of the present invention to produce an improved environmentally sealed electrical connector assembly including a pair of mating members of semi-rigid dielectric material, one of the members having an integral elliptical coupling ring which is radially deformed to effect latching engagement with detents on the other connector member.

It is a still further object of the present invention to produce an environmentally sealed electrical connector assembly that can be readily and economically manufactured.

The means for accomplishing the foregoing objects and other advantages of the present invention will become apparent to those skilled in the art from the following detailed description taken with reference to the accompanying drawings.

BRIEF DESCRIPTION OF THE DRAWINGS

FIG. 1 is a perspective view of the subject environmentally sealed electrical connector assembly in an unmated condition;

FIG. 5 is a perspective view, in section, showing the sealing engagement between a sealing boot, a conductor attached to a terminal, and the contact receiving cavity of the subject environmentally sealed connector;

DETAILED DESCRIPTION OF THE PREFERRED EMBODIMENT

Figure 2:
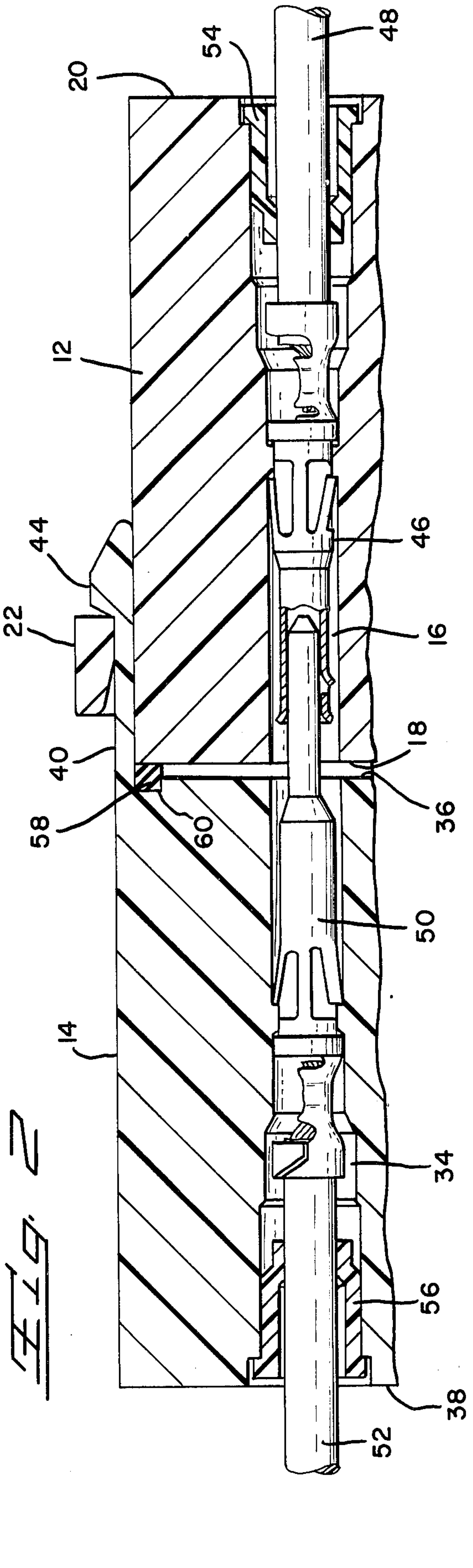
FIG. 2 is a longitudinal section through the mated connected members of FIG. 1.

The subject environmentally sealed connector assembly 10 includes a first mating member 12 and a second mating member 14 which may have a plug and receptacle configuration, as shown, or any of the other configurations that are well known in the electrical connector industry. The first mating member 12 includes a plurality of profiled contact receiving cavities or through bores 16 extending through the first mating member between mating face 18 and rear surface 20. An elliptical coupling ring 22, including finger grips 24, 26 is integrally attached to first mating member 12 by arms 28, 30. The first mating member 12 also includes at least one rigid key or polarizing projection 32. The second mating member 14 has a like plurality of contact receiving cavities 34 extending between mating face 36 and rear surface 38. An integral, forwardly extending annular flange or hood 40 surrounds mating face 36. At least one keyway 42 is formed within hood 40 aligned for receiving the respective key or polarizing projection 32. The hood 40 also includes at least one radially outwardly projecting detent 44 for engaging with the coupling ring 22. The first mating member 12 is loaded with a plurality of known matable first terminals 46, each crimped connected to an appropriate lead 48, while the second mating member 14 is loaded with a plurality of known matable second terminals 50 crimped to a like number of leads 52. The terminals may be selected from any of the well known types, such as the pin and receptacle shown, as well as hermaphroditic terminals. Each of the terminals is mounted in the respective housing member through a sealing boot 54, 56. Sealing means 58, such as a flat washer or O-ring are preferably provided in a recess 60 around the periphery of the mating face 36 to engage mating face 18 when the members 12, 14 are mated. The sealing means 58 could also be provided about individual terminals without departing from the scope of the present invention.

Each sealing boot 54, 56 is an integral member which includes a first cylindrical portion 62 of a first diameter joined to a second cylindrical portion 64 of a second larger diameter by an inclined neck 66 and a radially outwardly directed flange 68 at the free end of second portion 64. The inner diameter of the first portion 62 is sized to form a sealing engagement with a respective lead 48 while the outer diameter of second portion 64 is sized to form a sealing engagement with the bore wall of the cavity 16. The inclined neck 66 allows relative expansion and deformation of the first and second portions independently of each other. The inclined neck also has an inner taper which facilitates insertion of a terminal and lead from a point of entry from the second portion through the first portion.

Figure 3:
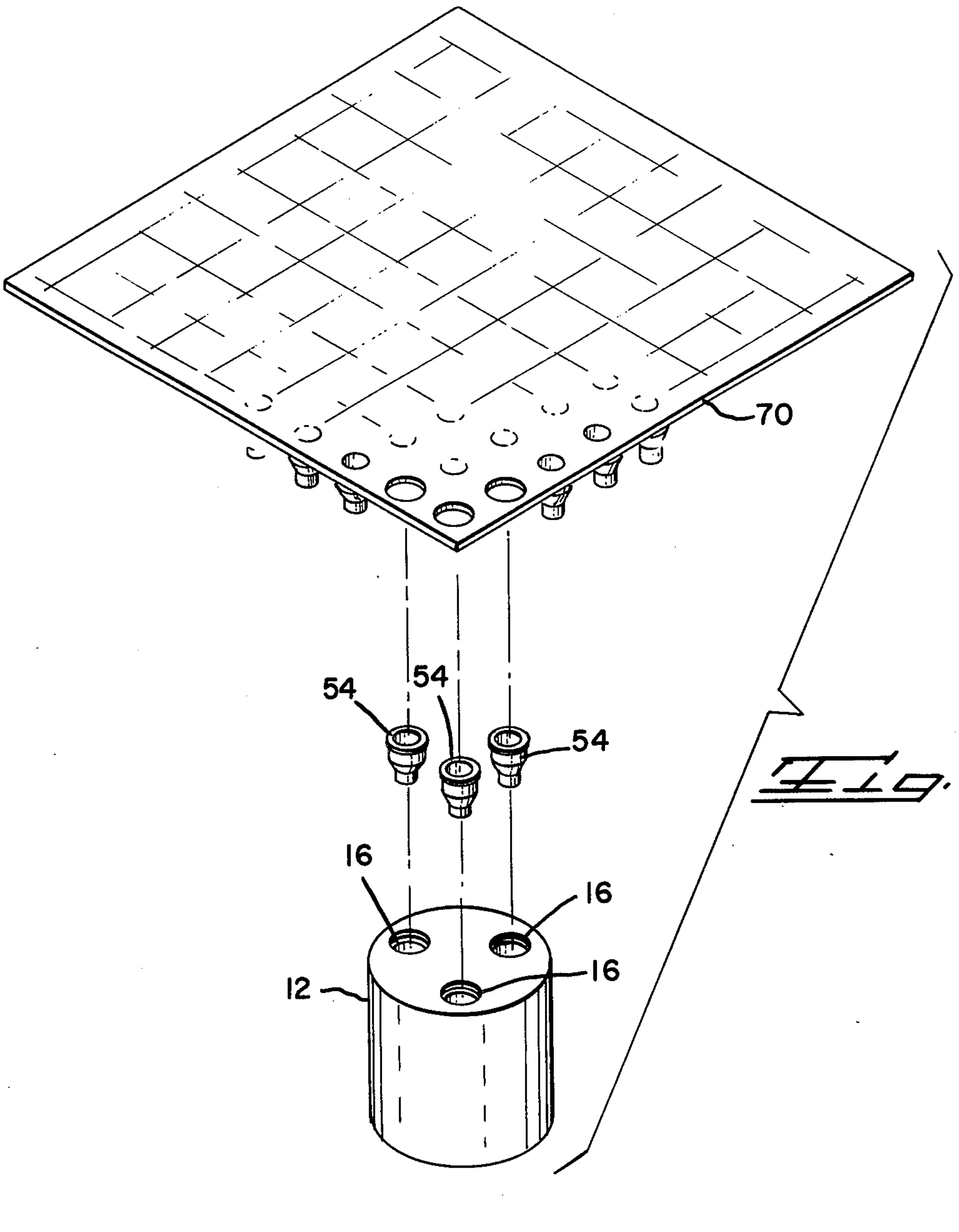
FIG. 3 is a diagrammatic perspective view showing a plurality of sealing boots formed according to the present invention in a single sheet and being blanked therefrom for gang insertion into recessed rear entry portions of contact receiving cavities of the subject connector members.
Figure 4:
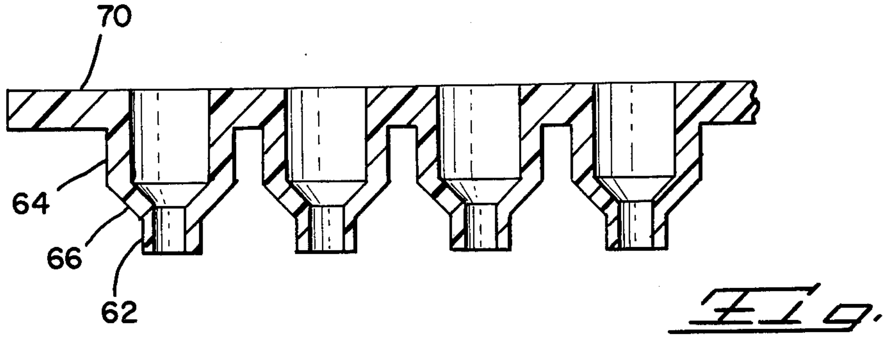
FIG. 4 is a transverse vertical section through a portion of the sheet of sealing boots of FIG. 3.

The sealing boots 54, 56 are preferably formed in sheet or strip fashion as shown at 70 in FIGS. 3 and 4. The sheet 70 of sealing boots is molded by conventional molding techniques, such as injection, compression or transfer molding, from a resilient material with the individual sealing boots 54 being spaced apart and located in such position that they can be gang blanked from the sheet 70 and gang inserted into respective cavities 16 of a connector housing 12, as shown in FIG. 3. The sealing boots are preferably blanked from the sheet 70 into a holding member (not shown), located with respect to a connector housing, and gang inserted into the respective cavities. However, it is within the scope of the invention to have the blanking and inserting achieved in a single operation with the proper selection of sealing boot and housing member materials.

Figure 6:
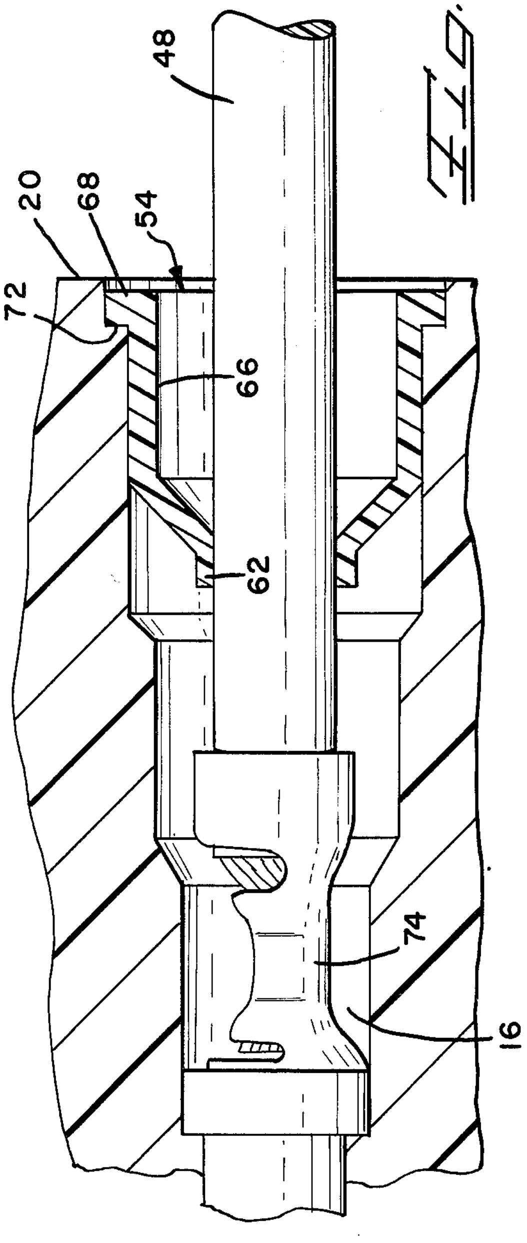
FIG. 6 is a longitudinal section, similar to FIG. 5, showing the sealing action achieved by the present invention.
Figure 7:
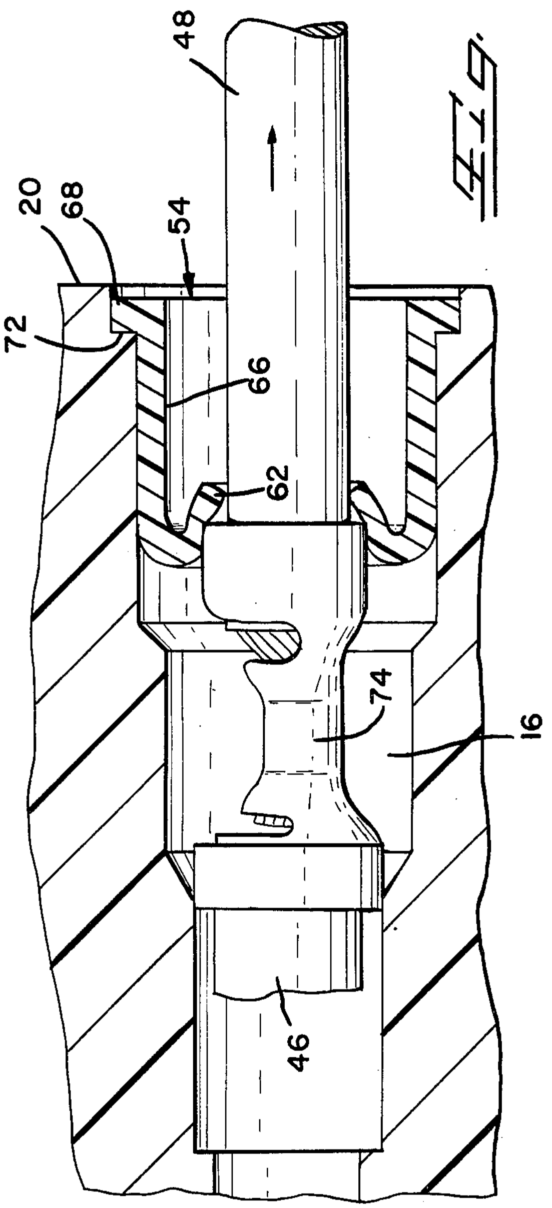
FIG. 7 is a longitudinal section, similar to FIG. 6, showing how the sealing action is maintained during the rearward removal of a terminal.
Figure 8:
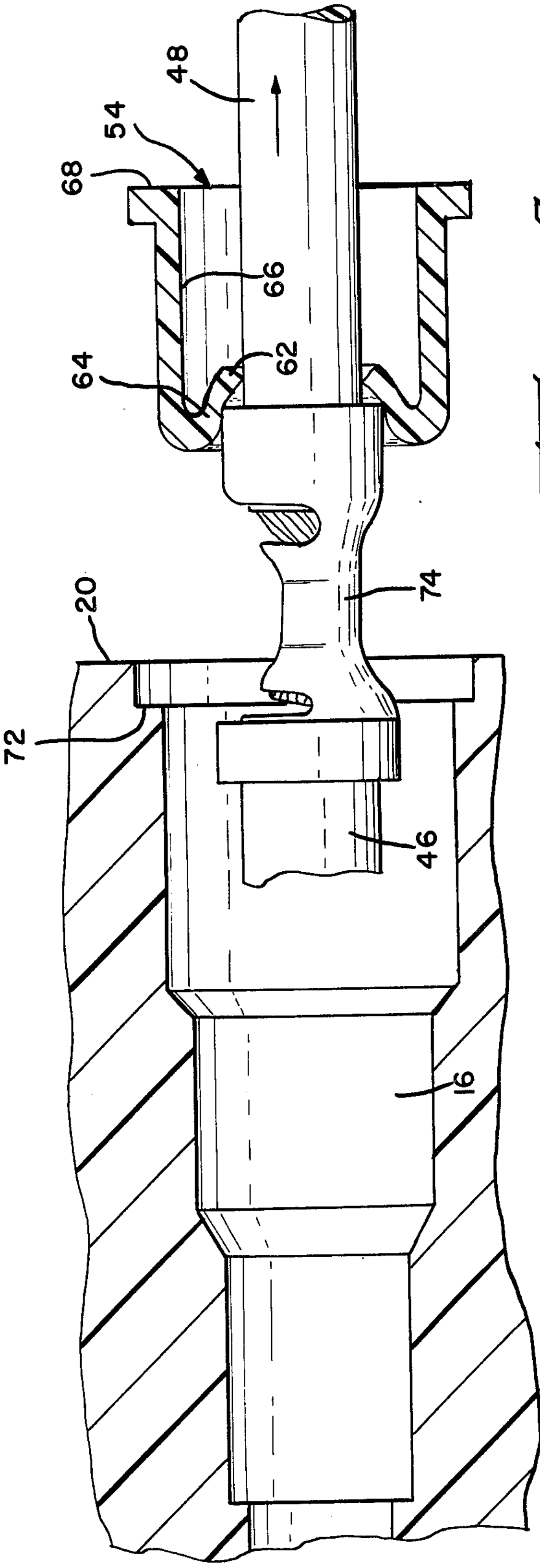
FIG. 8 is a longitudinal section, similar to FIGS. 6 and 7, showing a terminal and associated sealing boot fully removed from a contact receiving cavity of a housing member.
Figure 9:
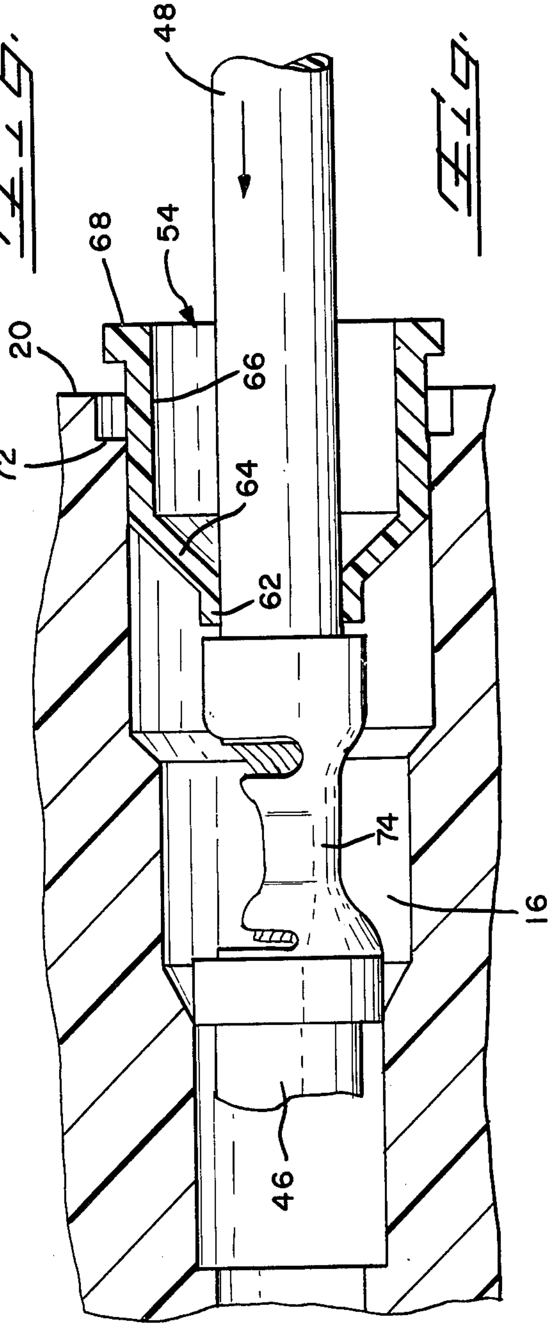
FIG. 9 is a longitudinal section, similar to FIGS. 6 to 8, showing insertion of a terminal and sealing boot into a contact receiving cavity of a housing member.

FIGS. 5 through 9 show the sealing action of a boot 54 and how sealing engagement is maintained throughout replacement of a terminal. As will be noted from FIGS. 5 and 6, the first cylindrical portion 62 of the boot 54 tightly engages the lead 48 while the second cylindrical portion 64 tightly engages the bore walls of the contact receiving cavity 16 of member 12. It should be also noted that the cavity 16 is profiled and includes a recessed annular lip or shoulder 72 adjacent the rear surface 20. When the sealing boot 54 is fully seated in cavity 16, the flange 68 engages shoulder 72 and is slightly recessed below rear surface 20. Drawing a terminal 46 out of the cavity first causes a wiping action between the first cylindrical portion 62 and lead 48. When the crimp barrel portion 74 of contact 46 engages the sealing boot 54, it causes portion 62 to be deflected inwardly upon itself, as shown in FIG. 7. The wiping action of the previously unexposed or uncontaminated portion of the lead 48 as it slides through the sealing boot 54 assures that any debris buildup within portion 66 of the sealing boot 54 will be removed with the boot and terminal and not be allowed to enter the connector member. When the boot 54 has been fully deflected, as shown in FIG. 7, sufficient radial pressure is exerted to overcome the frictional engagement between second cylindrical portion 66 and the bore walls of the contact cavity 16 so that the sealing boot 54 is withdrawn rearwardly together with the terminal 46. The terminal 46 can then be replaced and/or repaired as necessary and reinserted, as shown in FIG. 9, until the sealing boot 54 once again is fully mated in the bore of the contact receiving cavity of the member, as shown in FIG. 6. Proper seating of the boot in the cavity gives a tactile indication when lead portion 62 returns to the position shown in FIGS. 5 and 6.

The above described embodiment of the subject connector has been made with reference to electrical terminals and inner connection. The subject invention could equally as well be applied to the field of fiber optics for providing an environmentally sealed connector.

The present invention may be subject to many modifications and changes without departing from the spirit or essential characteristics thereof. The present embodiment is therefore to be considered in all respects as illustrative and not restrictive of the scope of the invention.

What is claimed is:

1. An environmentally sealed connector assembly comprising:

first and second mating members each having a body of semi-rigid insulating material with a mating front face and a rear face and at least one contact receiving cavity extending therein between said faces, a rear end of each said contact receiving cavity being recessed within the respective rear face;

a like number of first and second mating contacts each terminating respectively a first and second lead and each positioned within respective cavities of said first and said second mating members; and a plurality of sealing boots each mounted in a rear portion of a respective cavity in sealing engagement with the bore walls of a respective contact receiving cavity and with a respective lead passing therethrough, each said sealing boot lying totally beneath said rear face in a fully inserted sealing position.

2. An environmentally sealed connector assembly according to claim 1 further comprising:

sealing means at said mating faces.

3. An environmentally sealed connector assembly according to claim 1 further comprising means to secure said members together including:

a deformable elliptical ring secured to said first member by at least one resilient arm; and at least one detent integral with said second member and engageable by said ring.

4. An environmentally sealed connector assembly according to claim 1 further comprising:

at least one keying projection on one of said members; and at least one keyway on the other of said members receiving said keying projection whereby said members are polarized.

5. An environmentally sealed connector assembly according to claim 1 wherein:

said first and said second members are a plug and a receptacle respectively.

6. An environmentally sealed connector assembly according to claim 1 wherein:

said first and said second mating contacts are of the pin and receptacle type.

7. An environmentally sealed connector assembly according to claim 1 further comprising:

an annular hood surrounding and extending from said mating face of said second member and receiving said first member therein.

8. An environmentally sealed connector assembly according to claim 7 further comprising:

an annular recess in said mating face of said second member immediately inwardly of said hood; and an annular seal positioned in said annular recess.

9. An environmentally sealed connector assembly according to claim 1 wherein each said sealing boot comprises:

a first cylindrical portion having an inner diameter dimensioned to sealingly engage a respective lead received therein;

a second cylindrical portion having an outer diameter dimensioned to sealingly engage the bore walls of a respective contact receiving cavity;

an intermediate portion joining said first and said second portions allowing relative expansion and deformation of said first and second portions independently of each other; and an outwardly directed radial flange on the free end of said second portion.

10. An environmentally sealed connector assembly according to claim 9 wherein said intermediate portion further comprises:

an interior surface having a taper directed toward said first cylindrical portion to facilitate insertion of a lead through said sealing boot from a point of entry at said second cylindrical portion.

11. An environmentally sealed connector assembly according to claim 9 wherein:

said sealing boot provides tactile indication of proper seating within a respective contact cavity.

12. A method of effecting an environmental seal about leads entering contact receiving cavities of housing members of a connector assembly comprising the steps of:

molding a sheet of resilient material so as to define a plurality of sealing boots at spaced locations aligned with said contact receiving cavities of connector housing members to be sealed, each said boot having a first portion with an inner diameter dimensioned to sealingly engage a lead passing therethrough, a second portion having an outer diameter dimensioned to sealingly engage the walls of said cavities, and an intermediate portion allowing relative expansion and deformation of said first and said second portions independently of each other;

blanking said sealing boots from said sheet in gang fashion;

inserting each said sealing boot into a respective cavity of said housing members; and inserting a lead through each said sealing boot making a sealing engagement therewith.

13. A method according to claim 12 wherein:

said sealing boots are blanked from said sheet into a holding member; and said sealing boots are subsequently aligned with and inserted into said cavities of said housing members.

14. A method according to claim 12 wherein:

said sealing boots are blanked from said sheet and directly inserted into said cavities of said housing members.

15. A sealing boot for a connector assembly, where mating connector housing members are each formed of a relatively hard material to include cavities extending between rear and front faces for receiving therein, from said rear faces, respective leads terminated by matable contacts, said sealing boot including:

a seal body of relatively deformable material having a cylindrical leading portion, a middle portion, and a cylindrical rear portion, said leading portion having an inner diameter adopted to tightly grip the outer diameter of a respective lead, said rear portion having an outer diameter dimensioned to tightly fit within an inner diameter of said cavity, and said middle portion being integrally connected between said leading and rear portions to allow relative expansion and deformation of said portions independently of each other, said middle portion further including an interior surface having an inward taper to facilitate insertion of said lead through said seal from a point of entry through said rear portion toward said leading portion.

16. A method of environmentally sealing signal carrying leads at their point of entry into a connector housing comprising the steps of:

providing a plurality of sealing boots of resilient material formed integrally with a carrying strip;

aligning said sealing boots with respective lead receiving apertures in a surface of said connector housing; and blanking said sealing boots from said carrying strip and inserting them into respective cavities of said connector housing, said sealing boots having a portion with an outer diameter dimensioned to sealingly engage walls of said cavity and a portion with an inner diameter dimensioned to sealingly engage a lead inserted therein.

17. A method of environmentally sealing signal carrying leads at their point of entry into a connector housing according to claim 16 wherein:

said blanking and inserting of said sealing boots is effected substantially simultaneously by applying a punch to each said sealing boot and utilizing said cavity as a die to shear each said sealing boots from said strip.

* * * * *